Patented Aug. 27, 1940

2,212,956

UNITED STATES PATENT OFFICE 2,212,956

AZO DYESTUFFS AND PROCESS FOR PRODUCING SAME

Alfred Siegel, Roselle, N. J., assignor to E. I. du Pont de Nemours & Company, Wilmington, Del., a corporation of Delaware No Drawing. Application April 5, 1938, Serial No. 200,074

2 Claims. (Cl. 260—204)

This invention relates to new compositions of matter, and more particularly to new azo dyestuffs and processes for producing the same. In a more restricted sense, the invention concerns the production of improved, insoluble, maroon-colored azo dyestuffs, suitable for pigment use, said dyestuffs being of characteristically distinct shade purity, high tinctorial value, and excellent durability.

Maroon-colored pigments satisfactory for commercial usage have been very difficult to obtain heretofore. This for the reason that this type of color has been characteristically poor in durability qualities, fades badly, and exhibits poor stability towards light. These deficiencies become more evident and pronounced when such colors are employed in coating formulations subjected to exterior or atmospheric influences. A further disadvantage which previous maroon colors have exhibited is a pronounced and appreciable solubility in almost all solvents commonly employed in coating composition formulations—this being a very objectionable property when attempts are made to employ the color in variegated color work, because it tends to "bleed" into an overstripe of a different and associated color. Consequently, the color has been considered as unfit for anything but solid color work.

The production of maroon-colored pigments by combining 4-nitro-2-amino-anisol with the meta nitranilide of 2-hydroxy-3-naphthoic acid has been previously suggested, but the resultant pigment has proved deficient in the required commercial properties of distinctive shade purity, durability, and freedom from "bleeding."

I have found that, quite unexpectedly, a highly improved and commercially satisfactory azo dyestuff suitable for pigment use can be obtained if certain nitro-anisidines isomeric with 4-nitro-2-amino-anisol are employed and combined with the meta-nitranilide of 2-hydroxy-3-naphthoic acid. I have found further that the dyestuffs obtained by such combination exhibit very pronounced and decided improvements over previously known maroons, especially in the feature of combining high tinctorial shade and purity with excellent durability characteristics, and that these desirable properties are particularly manifested when my novel dyestuffs or pigments are employed in various types of coating compositions, such as the alkyd resin enamels or linseed oil type of paints.

Accordingly, it is among the objects of my invention to overcome the disadvantages inherent in previously known maroon-colored pigments, and to provide novel types of azo dyestuffs which exhibit novel and pleasing shade values and high tinctorial power, together with excellent durability characteristics. A further object includes the provision of a commercially satisfactory pigment which will inherently exhibit pronounced durability properties and gloss, even after prolonged and continued exposure to the atmospheric elements. An additional object includes the provision of a novel maroon-colored pigment which exhibits little or no "bleeding" in the presence of known and commonly used solvents. Other objects and advantages of my invention will be apparent from the ensuing description.

The foregoing and additional objects are obtainable in my invention, which broadly comprises coupling with the meta-nitranilide of 2-hydroxy-3-naphthoic acid diazotized isomeric anisidines from the group consisting of 3-nitro-4-amino-anisol (meta-nitro-para-anisidine) and 5-nitro-2-amino-anisol (meta-nitro-ortho-anisidine).

In a preferred and specific embodiment, the invention comprises coupling diazotized 3-nitro-4-amino-anisol with the meta-nitranilide of 2-hydroxy-3-naphthoic acid (variously known and denominated commercially as Naphthol AS—BS and "Naphthanil" BS).

In adapting the invention to practice, in accordance with its preferred embodiment, I first prepare a suitable mixture of meta-nitro-para-anisidine and water, pulping the same to a paste. I then dilute and diazotize the paste-like mixture with hydrochloric acid and sodium nitrite, in the usual and customary manner, preferably maintaining the temperature of the mix below substantially 5° C. I then filter the finished diazo to remove impurities present and then add the diazo mixture to a suitable, separately-prepared coupling bath of meta-nitranilide of 2-hydroxy-3-naphthoic acid, agitating the resultant mixture by vigorous stirring. The resultant dyestuffs, in its pure or toner state, or precipitated on substrata if in lake form, is then recovered after usual filtering, washing and drying steps.

The pigment thus obtained comprises a water-insoluble dye adapted for direct employment in usual and well-known vehicles or with common inorganic substances as substrata, such as aluminum hydrate, blanc fixe, etc., or combinations of each, depending upon the desired usage.

In order that the invention may be more clearly understood, the following examples are given, each being illustrative in character and in nowise in limitation of the invention:

Example I 168 parts of meta-nitro-para-anisidine (3-nitro-4-amino-anisol) are pasted well with about 400 parts of water and then diazotized in the usual manner with 110 parts of hydrochloric acid (100%) and 71 parts of sodium nitrite. It is essential that the temperature be kept below 5° C. and the finished diazo, which may be filtered to remove impurities, preferably have a volume of about 4000 parts or slightly less.

The coupling bath is prepared by dissolving 325 parts of meta nitranilide of 2-hydroxy-3-naphthoic acid previously pasted with about 25 parts of Turkey red oil in 85 parts of water, in a solution of 74 parts of caustic soda in 1500 parts of water at about 80° C. To this solution is added a solution of 51 parts of soda ash in 375 parts of water and the whole diluted slowly with good agitation to a total of about 8000 parts at 30° C.

Coupling is brought about by adding the diazo beneath the surface in about 30 minutes. After a period of agitation and the addition of 20 parts of caustic soda in 250 parts of water, the pigment is developed at the boil, washed free of soluble salts and dried in an oven at about 60° C.

From this procedure, 465 parts of an excellent, stable, dark maroon pigment are obtained, suitable for use in various types of coating compositions, enamels, or paints of highly desirable characteristics.

Example II

Example I was duplicated, except that in lieu of the meta-nitro-para-anisidine employed therein, 5-nitro-2-amino-anisol was used and coupled with the meta-nitranilide of 2-hydroxy-3-naphthoic acid. The resultant pigment comprised an improved, dark maroon dyestuff, likewise useful in various types of coating compositions, and when employed therein exhibiting highly desirable durability characteristics.

The pigments obtained in accordance with my invention will be advantageously darker in shade, will be less prone to undesired "bleeding" when employed in variegated color work, will be less sensitive to the conditions of coating composition preparation, especially in regard to effect on "bleeding" characteristics, and will exhibit excellent and highly durable qualities when employed in common finishes. Because of the extremely deep, rich maroon shade and full tone values which my novel pigments exhibit, and their excellent durability characteristics and relative freedom from miscibility in ordinary solvents, these pigments will be of enhanced beauty and decorative value, rendering them desirable and useful in a great variety of vehicles and solvents utilized in making up various types of coating formulations. The pigments may be incorporated in such formulations in any desired and well known manner and through resort to various types of apparatus, depending upon the type of vehicle employed and the degree of ultimate fineness required. Thus, ball mills, roller mills, Burstone mills, or heavy duty dough mixers are advantageously employable for the purpose, the presence of grinding media being obvious to those skilled in the art. My novel pigments will be advantageously useful for employment in well known enamel types of coating compositions, such as those of the alkyd resin type, as well as in linseed oil paints. By alkyd resin enamels, I refer to the condensation products of glycerol and phthalic anhydride, as more particularly disclosed in U. S. Patent 1,885,024 to Lewers and Patterson. Likewise, and as more particularly disclosed and claimed in the concurrently filed application of R. T. Hucks, Serial No. 200,123, filed April 5, 1938, my novel pigments are adapted for particular use in many automotive lacquers and finishes, particularly those of the cellulose derivative type, their use in automotive finishes overcoming objectionable bronzing or discoloration which previous maroon colors have afforded, by reason of the conditions which prevail in applying automotive finishes.

I claim as my invention:

1. A water-insoluble, maroon-colored pigment, high in tinctorial power and durability characteristics, the combination of diazotized 3-nitro-4-amino-anisol with the meta-nitranilide of 2-hydroxy-3-naphthoic acid.

2. A process for producing durable, maroon-colored azo dyestuffs comprising combining with the meta-nitranilide of 2-hydroxy-3-naphthoic acid diazotized 3-nitro-4-amino-anisol.

ALFRED SIEGEL.